United States Patent [19]
Torii et al.

[11] Patent Number: 5,549,175
[45] Date of Patent: Aug. 27, 1996

[54] CONTROL SYSTEM FOR CARRIAGE

[75] Inventors: Akito Torii, Okazaki; Naoki Matsumoto; Shigeru Takeda, both of Aichi-ken, all of Japan

[73] Assignee: Nippondenso Co., Ltd., Kariya, Japan

[21] Appl. No.: 408,978

[22] Filed: Mar. 23, 1995

[30] Foreign Application Priority Data

Mar. 24, 1994 [JP] Japan ................................ 6-054096

[51] Int. Cl.$^6$ ............................. B62D 61/12; B62K 13/00
[52] U.S. Cl. ........................................... 180/209; 280/703
[58] Field of Search .......................... 180/209; 280/703, 280/704

[56] References Cited

U.S. PATENT DOCUMENTS

| | | | |
|---|---|---|---|
| 4,805,710 | 2/1989 | Jarl et al. | 180/24.02 |
| 5,159,554 | 10/1992 | Buma et al. | 280/703 |
| 5,201,819 | 4/1993 | Shiraishi et al. | 180/24.02 |
| 5,303,788 | 4/1994 | Muselli et al. | 280/703 |

FOREIGN PATENT DOCUMENTS

| | | |
|---|---|---|
| 5-69795 | 3/1993 | Japan . |
| 5-134748 | 6/1993 | Japan . |
| 5-170102 | 7/1993 | Japan . |

*Primary Examiner*—Kenneth R. Rice
*Attorney, Agent, or Firm*—Cushman, Darby & Cushman, L.L.P.

[57] ABSTRACT

In a control system for a carriage, a pair of driven wheels are raised or lowered by an elevator section so as to suppress inclination of the carriage which would be otherwise caused due to acceleration/deceleration of the carriage. Specifically, during starting acceleration of the carriage, the driven wheels are raised so as to cancel extended amounts of springs of the driven wheels. On the other hand, during steady running of the carriage, the driven wheels are lowered by a constant amount to reduce loads applied to caster sections so that vibration applied to the carriage are reduced as a whole. During braking acceleration (deceleration) of the carriage, the driven wheels are lowered so as to cancel contracted amounts of the springs of the driven wheels.

15 Claims, 11 Drawing Sheets

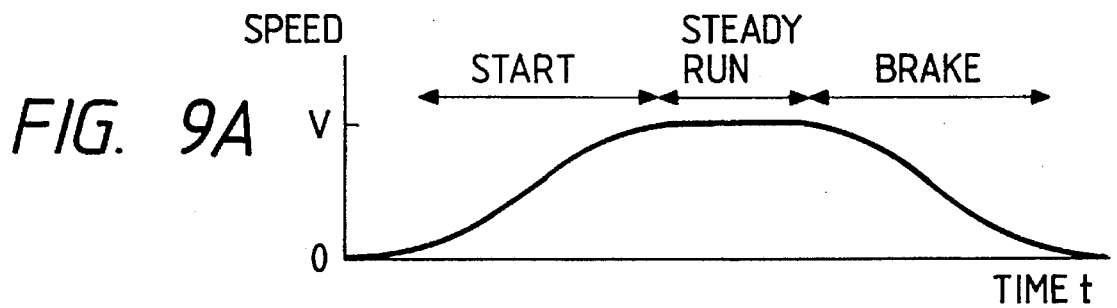
FIG. 9A
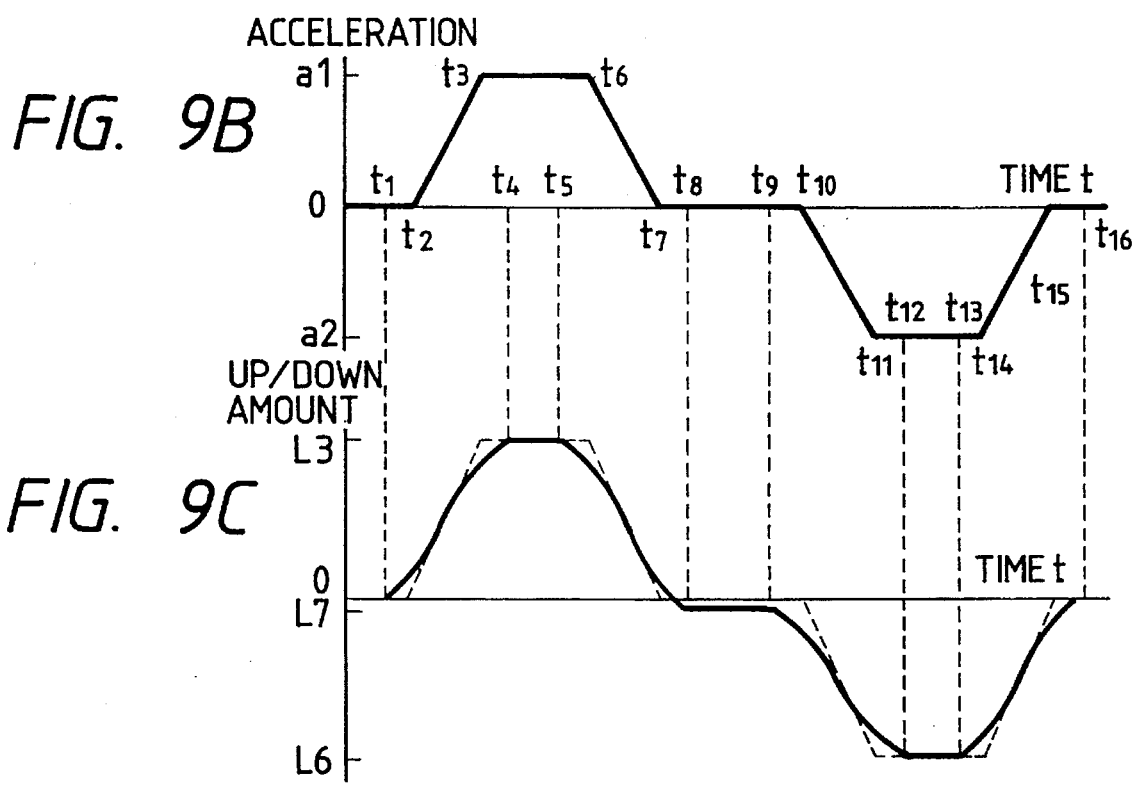
FIG. 9B
FIG. 9C
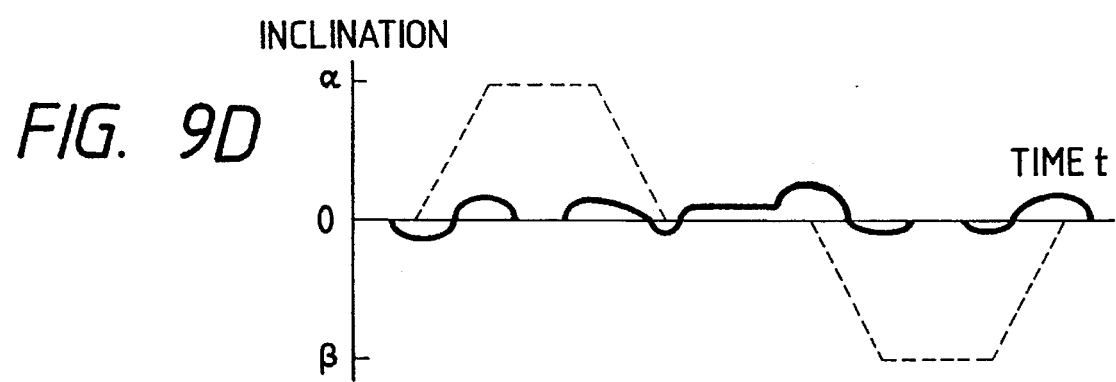
FIG. 9D

STARTING DIRECTION ←

BRAKING DIRECTION →

CONTROL SYSTEM FOR CARRIAGE

BACKGROUND OF THE INVENTION

1. Field of the Invention

The present invention relates to a suspension system of a conveying carriage or the like which runs by means of driven wheels, and more specifically, to a technique which can suppress, such as, inclination and vibration of the carriage while running.

2. Description of the Prior Art

Japanese First (unexamined) Patent Publication No. 5-170102 discloses a conventional suspension system of a conveying carriage. A structure of this suspension system will be explained with reference to FIG. 13.

In FIG. 13, a conveying carriage 1 includes a carriage body 11. A suspension system for the carriage body 11 includes compliance wheels 13a, 13b, 13c and 13d, a coupling plate 14 for coupling the compliance wheels 13a and 13b arranged laterally relative to the running direction of the carriage 1, and a coupling plate 15 for coupling the laterally arranged compliance wheels 13c and 13d. The suspension system further includes support bodies 131a, 131b, 131c and 131d for supporting the compliance wheels 13a~13d, and support bodies for supporting driven wheels 12a and 12b. The suspension system further includes vibration-proof means 16a, 16b, 16c and 16d provided between the coupling plates 14, 15 and the carriage body 11 at positions corresponding to the respective compliance wheels 13a~13d, and up/down slide mechanisms 17a, 17b, 17c and 17d extending vertically upward from the coupling plates 14 and 15 and provided between the coupling plates 14, 15 and four corners of the carriage body 11. The driven wheels 12a and 12b may also be mounted to the carriage body 11 using a coupling plate, vibration-proof means and up/down slide mechanisms.

According to the conventional suspension system, vertical vibration caused by loads of the carriage 1 is absorbed by the vibration-proof means 16a~16d and the up/down slide mechanisms 17a~17d, and the vibration proof means of the driven wheels 12a and 12b and the up/down slide mechanisms thereof. On the other hand, rocking motions and inclination of the carriage in the longitudinal and lateral directions can be reduced through the multiplier action of the coupling plates 14, 15 and the up/down slide mechanisms 17a~17d and of the coupling plate of the driven wheels 12a and 12b and the up/down slide mechanisms thereof.

However, according to the conventional suspension system, the laterally arranged compliance wheels 13a, 13b and 13c, 13d are coupled by the corresponding coupling plates 14 and 15, respectively. Accordingly, while the carriage runs on a running surface 18 having irregularities, such as, depressions, it is possible that one of the right and left compliance wheels is separated from the running surface 18. This may cause a posture of the carriage to be unstable, lowers the running linearity of the carriage and increases the vibration of the carriage.

Further, in general, the increment of carrying capacity of the carriage improves the production efficiency. Accordingly, when running on a carrying route where a start position and a stop position are fixed, it is required to increase a starting acceleration and a braking acceleration (deceleration) so as to allow the carriage to run at a high speed and for a long time. However, the increment of the starting and braking accelerations may increase the inclination and vibration of the carriage.

SUMMARY OF THE INVENTION

Therefore, it is an object of the present invention to provide an improved control system for a carriage.

According to one aspect of the present invention, a control system for a carriage which runs on a running surface, comprises a frame forming an outer structure of the carriage; a plurality of wheels mounted to the frame; a drive source for transmitting a driving force to at least one of the wheels; and posture control means, depending on an acceleration condition of the carriage, for raising or lowering at least one of the wheels relative to the frame so as to change a posture of the carriage.

According to another aspect of the present invention, a control system for a carriage which runs on a running surface, comprises a frame forming an outer structure of the carriage; a plurality of wheels mounted to the frame; a drive source for transmitting a driving force to at least one of the wheels; and posture control means, depending on a running condition of the carriage, for raising or lowering at least one of the wheels relative to the frame so as to change a posture of the carriage, the posture control means including elevator means for lowering, during a steady running of the carriage, at least a pair of the wheels relative to the frame, the pair of the wheels being arranged at a lower center of the frame.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 9A, 9B, 9C and 9D are time charts, respectively, for explaining how to operate the elevator section, wherein time axes in the respective figures coincide with each other;

DESCRIPTION OF THE PREFERRED EMBODIMENT

Now, a preferred embodiment of the present invention will be described with reference to FIGS. 1 to 12, wherein the present invention is applied to a conveying carriage.

Figure 1:
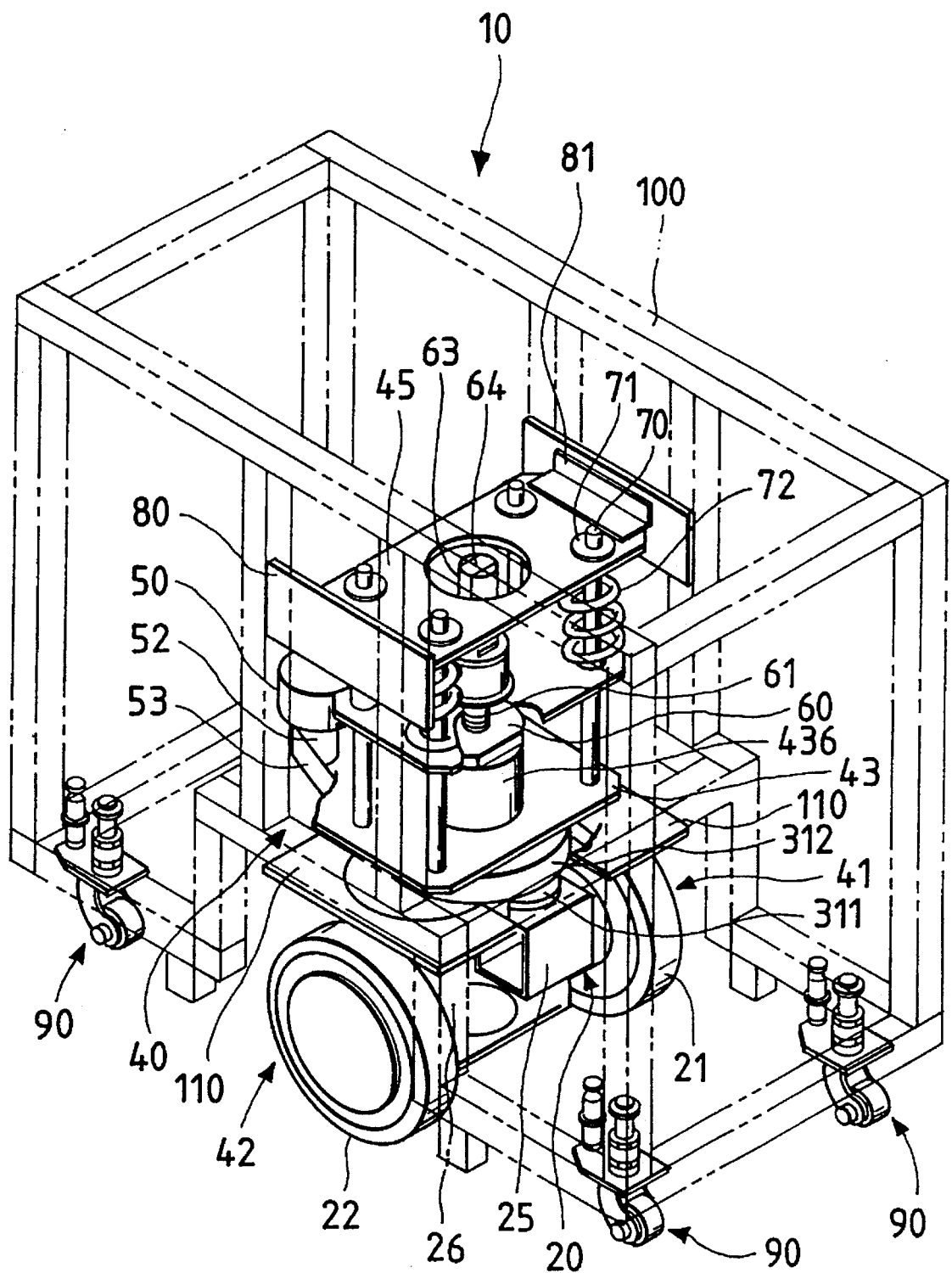
FIG. 1 is a perspective view showing an arrangement of a drive section, an elevator section and caster sections of a carriage according to a preferred embodiment of the present invention.
Figure 2:
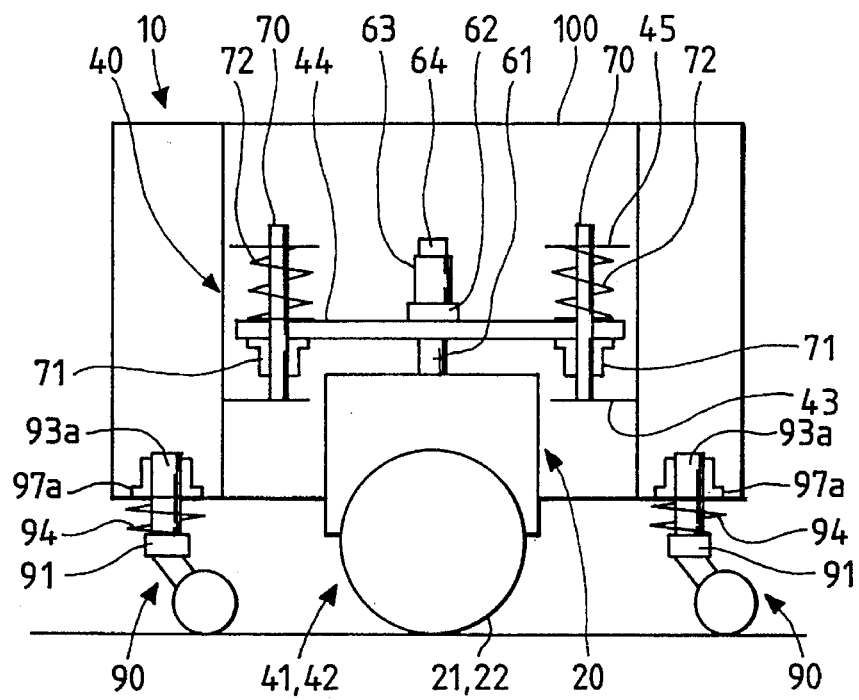
FIG. 2 is a diagram for schematically showing a structure of the carriage according to the preferred embodiment.

As shown in FIGS. 1 and 2, a conveying carriage 10 includes a drive section 20, an elevator section 40, caster sections 90 and a carriage frame 100. The drive section 20 is provided at the lower center of the carriage frame 100. The elevator section 40 is provided over the drive section 20 for moving upward and downward the drive section 20. The caster sections 90 are provided at four lower corners of the carriage frame 100, respectively.

First, structures of the drive section 20 and the elevator section 40 will be described hereinbelow.

Figure 3:
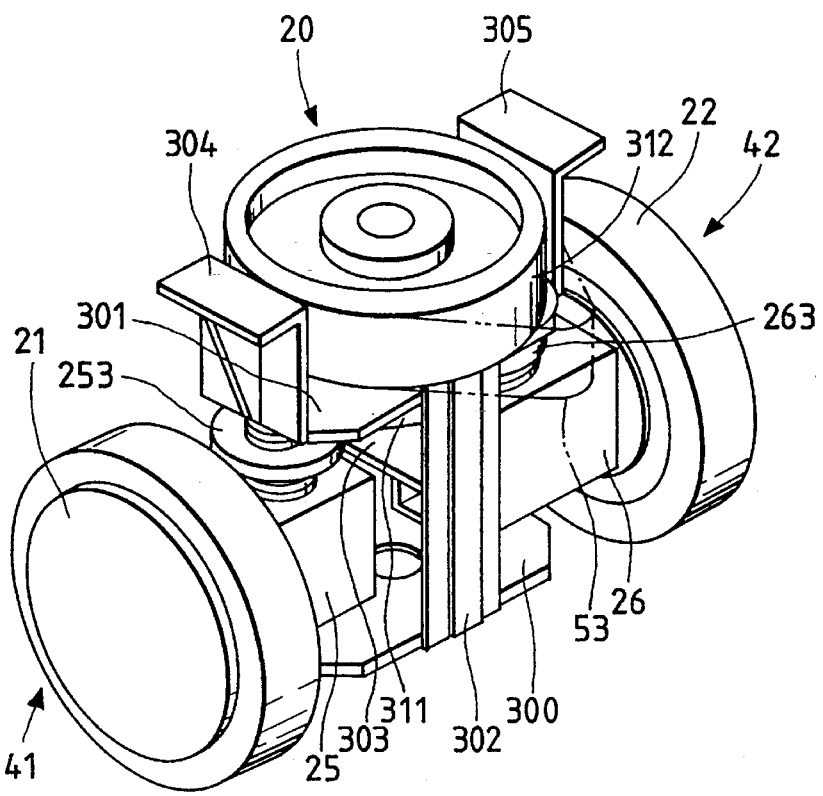
FIG. 3 is a perspective view showing the drive section of the carriage according to the preferred embodiment.
Figure 5:
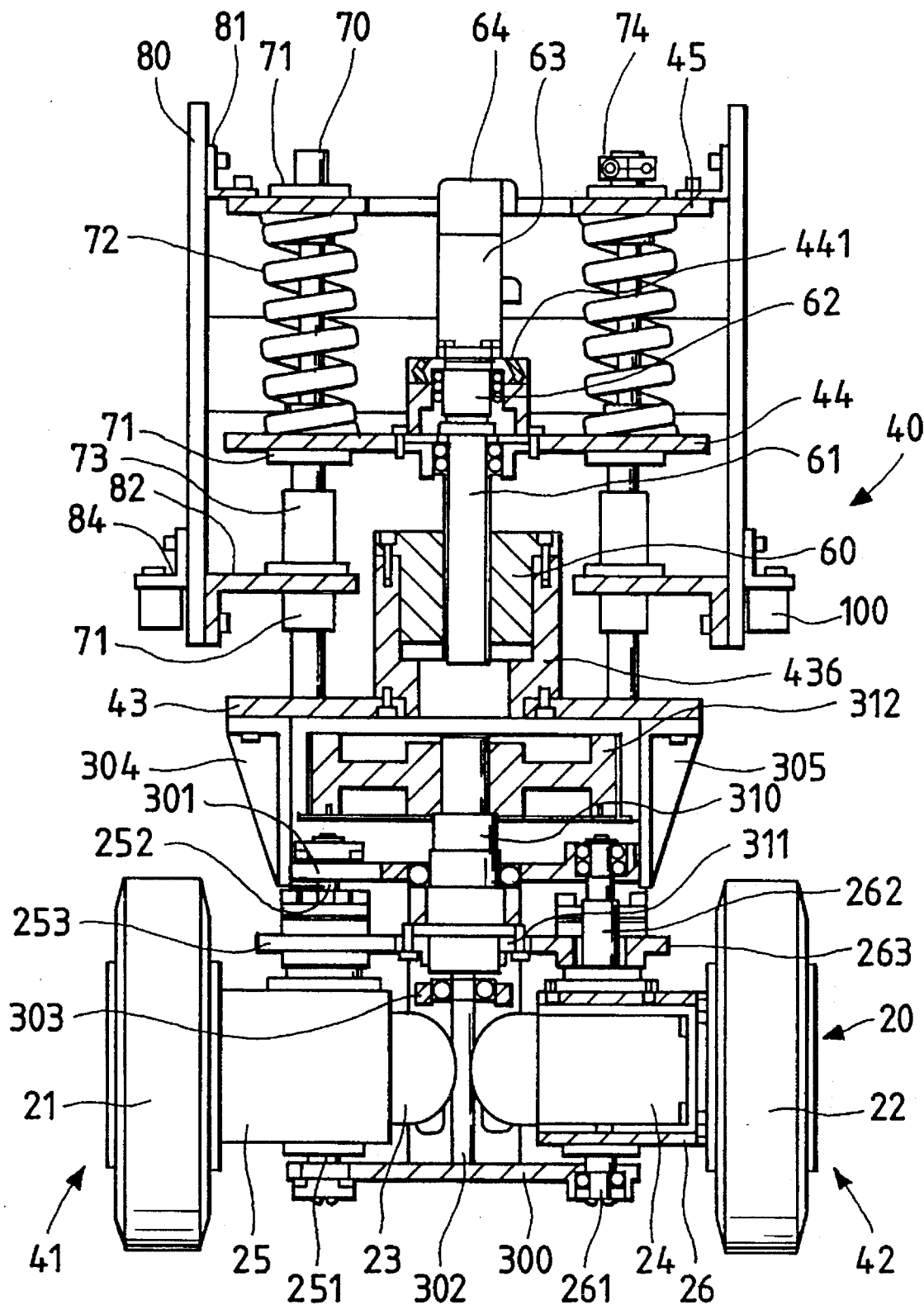
FIG. 5 is a partly-sectioned front view showing the drive section and the elevator section of the carriage according to the preferred embodiment.
Figure 6:
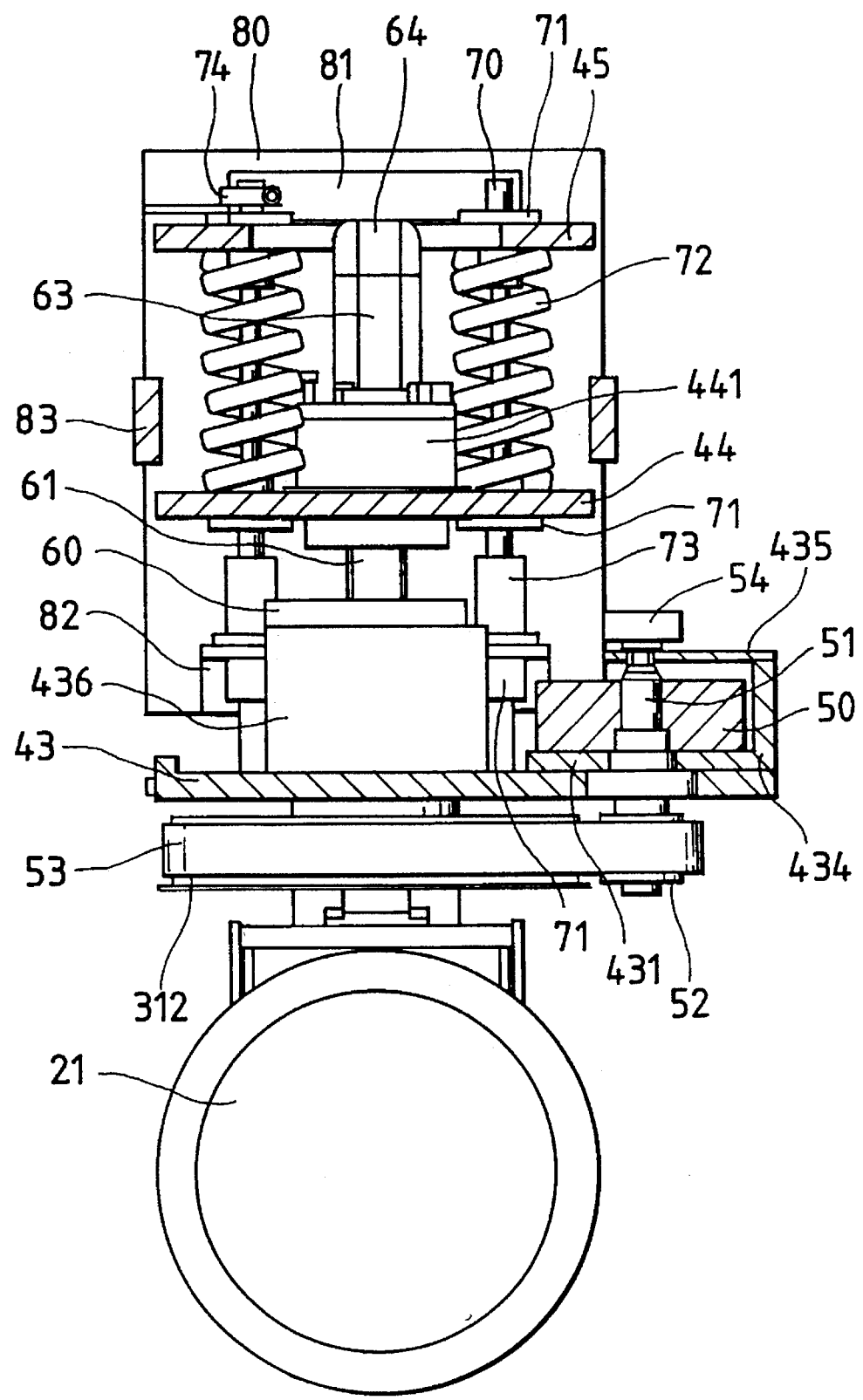
FIG. 6 is a partly-sectioned side view showing the drive section and the elevator section of the carriage according to the preferred embodiment.

As shown in FIGS. 3, 5 and 6, the drive section 20 includes a pair of right and left travel sections 41 and 42 and a large pulley 312.

The travel sections 41 and 42 respectively include travel servomotors 23 and 24, driven wheels 21 and 22 coupled with the servomotors to be driven, and motor covers 25 and 26 housing the travel servomotors 23 and 24 therein. At the upper side of the motor cover 26 is arranged an upper cover shaft 262 fixed to the motor cover 26, and at the lower side of the motor cover 26 is arranged a lower cover shaft 261 fixed to the motor cover 26. The upper cover shaft 262 and the lower cover shaft 261 are arranged coaxially with each other and mounted to an upper cover 301 and a lower cover 300, respectively, via corresponding bearings so as to be rotatable relative to the upper and lower covers 301 and 300. The upper cover 301 and the lower cover 300 are coupled together by a pair of coupling plates 302. Similarly, at the upper side of the motor cover 25 is arranged an upper cover shaft 252 fixed to the motor cover 25, and at the lower side of the motor cover 25 is arranged a lower cover shaft 251 fixed to the motor cover 25. The upper cover shaft 252 and the lower cover shaft 251 are arranged coaxially with each other and mounted to the upper cover 301 and the lower cover 300, respectively, via corresponding bearings so as to be rotatable relative to the upper and lower covers 301 and 300. Accordingly, the travel section 41 is allowed to make a pivotal or turning motion about a vertical axis defined by the coaxial upper and lower cover shafts 252 and 251. Similarly, the travel section 42 is allowed to make a pivotal or turning motion about a vertical axis defined by the coaxial upper and lower cover shafts 262 and 261.

At the center of the large pulley 312, an upper end of a pulley shaft 310 is fixedly coupled. The pulley shaft 310 penetrates the upper cover 301 via a bearing and is mounted at its lower end to a middle cover 303 via a bearing. The middle cover 303 is fixed to intermediate portions of the coupling plates 302. A center gear 311 is fixedly mounted onto the pulley shaft 310 between the upper cover 301 and the middle cover 303. Further, right and left gears 253 and 263 are fixedly mounted onto the upper cover shafts 252 and 262, respectively. By cooperation of the center gear 311 and the right and left gears 253 and 263, the right and left travel sections 41 and 42 can be turned in phase with each other. For coupling the drive section 20 with the elevator section 40, L-shaped plates 304 and 305 are fixedly mounted to the upper cover 301, respectively.

Figure 4:
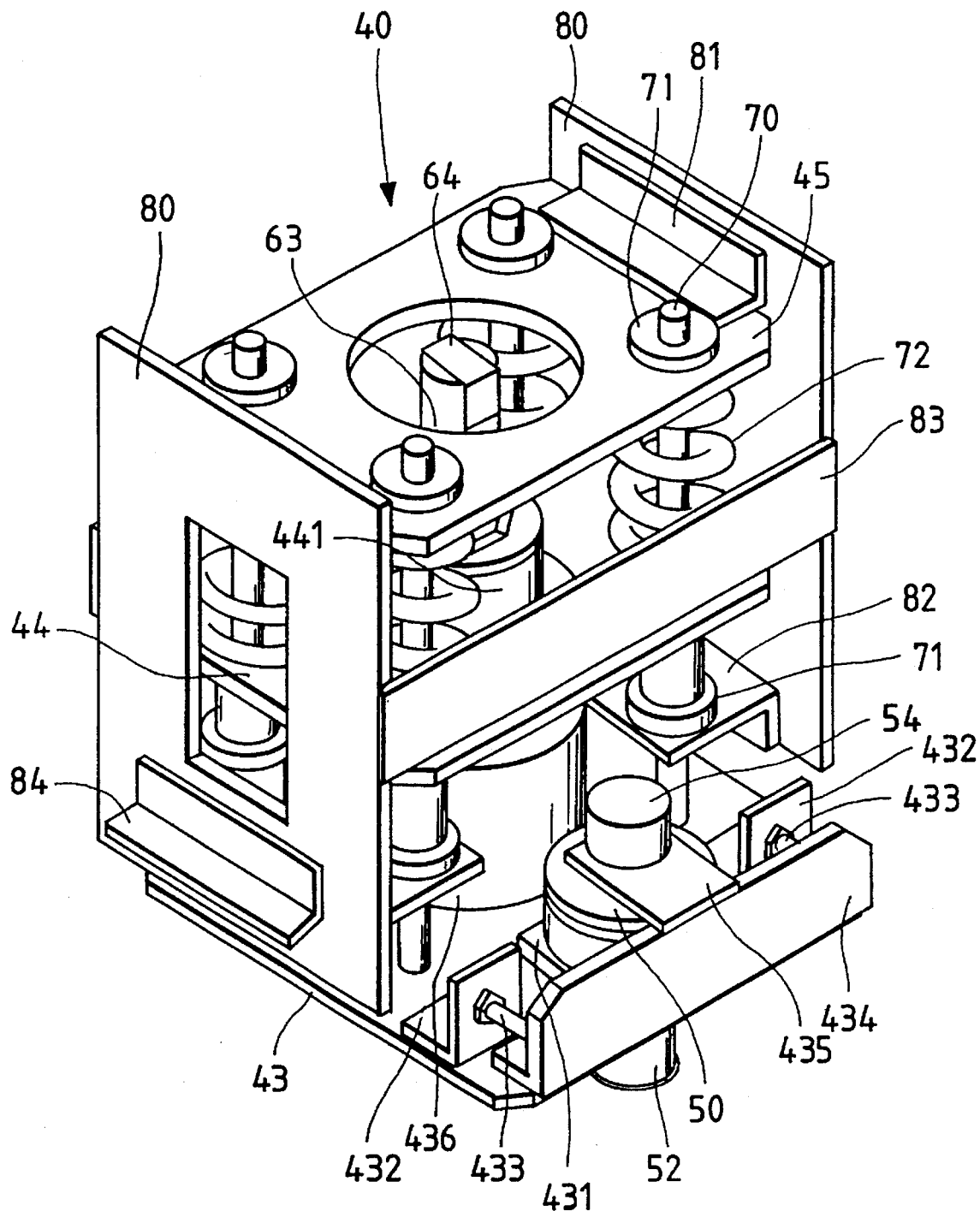
FIG. 4 is a perspective view showing the elevator section of the carriage according to the preferred embodiment.

As shown in FIGS. 4 and 5, the elevator section 40 includes a negative-actuated electromagnetic brake 50, an elevator encoder 64, an elevator servomotor 63, a reduction gear unit 62, a ball screw 61, a nut 60, four linear shafts 70 and corresponding springs 72.

A pair of L-shaped plates 432 are fixedly provided on a lower plate 43. Each of the L-shaped plates 432 is coupled with one end of a coupling bar 433 which can extend or contract in an axial direction. The other ends of the coupling bars 433 are coupled to a wide plate 434. The plate 434 is allowed to slide on the lower plate 43 by adjusting the axial extension/contraction of the coupling bars 433. For coupling the drive section 20 to the elevator section 40, the L-shaped plates 304 and 305 of the drive section 20 are fixed to a lower surface of the lower plate 43.

As seen from FIG. 4, the plate 434 has an extended portion 431 onto which the electromagnetic brake 50 is fixedly mounted. To an upper edge of the plate 434 is fixed a coupling plate 435 to which an encoder 54 is fixed. As best seen in FIG. 6, a brake shaft 51 passes through the electromagnetic brake 50. The brake shaft 51 extends downward to pass through openings formed in the plate 434 and the lower plate 43, respectively, so as to be coupled with a small pulley 52 at its lower end. The small pulley 52 is connected to the large pulley 312 via a pulley belt 53 so that rotation of the large pulley 312 is transmitted to the small pulley 52 to further rotate the brake shaft 51. The brake shaft 51 extends upward to pass through an opening formed in the coupling plate 435 so as to be coupled with the encoder 54. The encoder 54 detects a turning angle of the travel section 41, 42 by monitoring rotation of the brake shaft 51, which rotation is transmitted via the right and left gears 253 and 263, the center gear 311, the pulley shaft 310, the large pulley 312, the pulley belt 53 and the small pulley 52.

On the lower plate 43 is fixed a coupling block 436 to which the nut 60 is fixed. Further, on an intermediate plate 44 arranged above the lower plate 43 is fixed a coupling block 441. To the coupling block 441, the elevator servomotor 63 connected to the elevator encoder 64 at its upper side is fixed. Further, the reduction gear unit 62 coupled with the elevator servomotor 63 at its one end is mounted in the coupling block 441 and connected to the ball screw 61 at its other end. The ball screw 61 penetrates the intermediate plate 44 via a bearing interposed therebetween and screws into the nut 60 at its lower end. With this arrangement, when the elevator servomotor 63 is activated to rotate the ball screw 61 via the reduction gear unit 62, the nut 60 moves vertically along the ball screw 61 so that the drive section 20 is raised or lowered via the fixed engagement between the lower plate 43 and the L-shaped plates 304 and 305 fixed to the upper cover 301. As appreciated, the nut 60 moves upward or downward depending on the rotating direction of the elevator servomotor 63.

A pair of elevator covers 80 are provided at both sides of the elevator section 40. The elevator covers 80 are coupled with each other via a pair of coupling plates 83 and further fixed to the carriage frame 100 via corresponding L-shaped plates 84. An upper plate 45 positioned above the intermediate plate 44 is fixed to the elevator covers 80 via a pair of L-shaped plates 81.

On the upper surface of the lower plate 43 are fixed the linear shafts 70 each extending vertically upward. L-shaped plates 82 are fixed to the elevator covers 80, respectively, at positions between the lower plate 43 and the intermediate plate 44. Two of the four linear shafts 70 penetrate each of the L-shaped plates 82 via respective direct-acting bearings 71. Each linear shaft 70 also penetrates a height-adjusting pipe collar 73 positioned above the direct-acting bearing 71. Each linear shaft 70 further penetrates the intermediate plate 44 and the upper plate 45 via respective direct-acting bearings 71. Accordingly, each linear shaft 70 is vertically slidable via the corresponding direct-acting bearings 71. Between the intermediate plate 44 and the upper plate 45, the springs 72 are arranged around the corresponding linear shafts 70, respectively. Limit rings 74 are fixed to the respective linear shafts 70 at their upper ends for adjusting a downward distance of the drive section 20.

Vibration applied from a running surface to the drive section 20 is transmitted to the intermediate plate 44 via the lower plate 43 and the ball screw 61 and then absorbed by the springs 72.

Now, structures of the caster sections 90 will be described hereinbelow.

Figure 7:
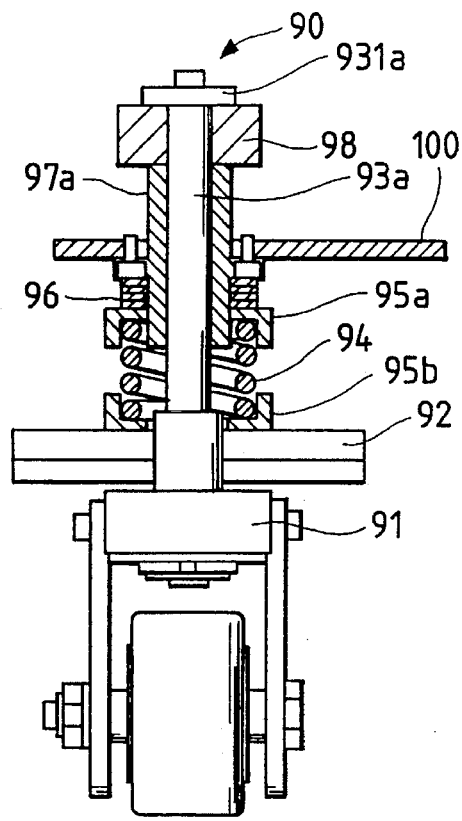
FIG. 7 is a partly-sectioned front view showing the caster section of the carriage according to the preferred embodiment.
Figure 8:
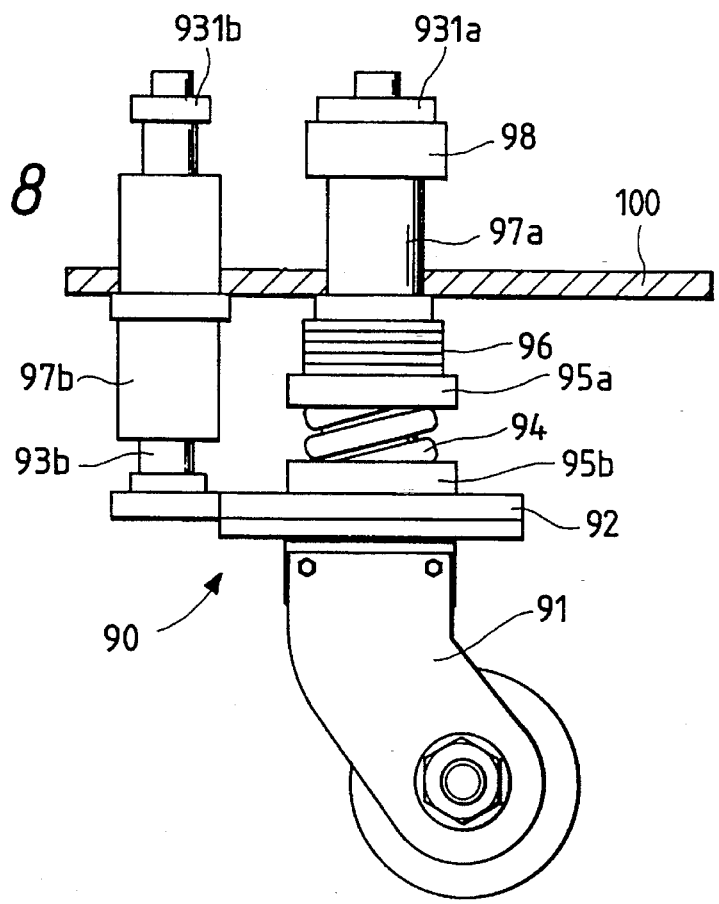
FIG. 8 is a side view showing the caster section of the carriage according to the preferred embodiment.

As shown in FIGS. 7 and 8, each caster section 90 includes a caster 91, a caster plate 92, linear shafts 93a and 93b and a spring 94.

The caster 91 is fixed to a lower surface of the caster plate 92. The linear shafts 93a and 93b are fixed to an upper surface of the caster plate 92, each extending vertically upward.

Around the linear shaft 93a is disposed a spring 94 which extends between upper and lower spring covers 95a and 95b working as spring seats. The lower spring cover 95b is urged onto the upper surface of the caster plate 92, while the upper spring cover 95a is urged onto a lower side of a height-adjusting shim 96 which is arranged around a direct-acting bearing 97a. The direct-acting bearing 97a is fixed to the carriage frame 100 and receives therethrough the linear shaft 93a which is thus rotatable and vertically slidable. A rubber cushion 98 is provided around an upper end portion of the linear shaft 93a. To an upper end of the linear shaft 93a, a shaft stopper 931a is fixed for preventing the rubber cushion 98 from slipping off the linear shaft 93a. The linear shaft 93b is slidably mounted to the carriage frame 100 via a direct-acting bearing 97b and fixed with a shaft stopper 931b at its upper end.

The caster plate 92 is prevented from rotation, but allowed to displace vertically so as to absorb vibration applied from the running surface by means of the spring 94 and the rubber cushion 98. Further, since the caster sections 90 are mounted to the carriage frame 100 independently of each other, the casters 91 move upward and downward depending on irregularities on the running surface so that separation of any of the casters 91 from the running surface is effectively prevented.

Now, how to operate the elevator section 40 will be described hereinbelow. For the sake of facilitating explanation, the caster sections 90 are divided into a front caster 202 and a rear caster 203 with respect to the driven wheels 21 and 22.

FIGS. 9A and 9B show time-domain variations of speed and acceleration of the carriage, respectively. In FIG. 9A, the carriage is started at time t2 and stopped at time t15. The acceleration of the carriage is controlled as represented by solid line in FIG. 9B. Specifically, the acceleration is changed in the shape of trapezoid during the starting and braking of the carriage, while kept at 0 (zero) during the steady running of the carriage.

First, the running state of the carriage while the elevator section 40 is not operated will be explained hereinbelow.

Figure 10A:
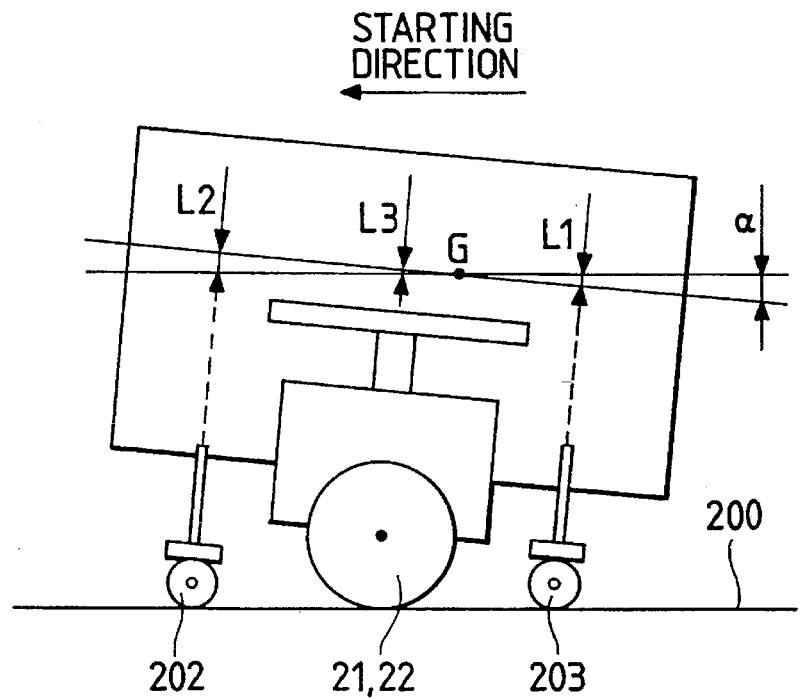
FIGS. 10A and 10B are diagrams, respectively, for explaining inclination of the carriage when the elevator section is not operated.

During the starting acceleration from time t2 to time t7, in the state where the acceleration reaches a1, the posture of the carriage is inclined by an angle α in a direction so as to sink or lower the rear part of the carriage with respect to the center of gravity G of the carriage, as shown in FIG. 10A, due to frictional resistance between the driven wheels 21 and 22 and a running surface 200. In this preferred embodiment, the driven wheels 21 and 22 are positioned forward of the center of gravity G of the carriage. Accordingly, the spring 94 of the forward caster 202 extends by a length L2, while the spring 94 of the rear caster 203 contracts by a length L1. This causes the springs 72 of the driven wheels 21 and 22 to extend by a length L3. The length L3 represents a value as measured at a center axis passing the elevator encoder 64, the servomotor 63, the reduction gear unit 62 and the ball screw 61, and thus represents a mean value of extended lengths of the four springs 72.

During the steady running from time t7 to time t10, in the state where the acceleration is 0 (zero), the springs 72 of the driven wheels 21 and 22 and the springs 94 of the front and rear casters 202 and 203 return to the initial lengths so that the inclination of the carriage also becomes 0 (zero).

Figure 10B:
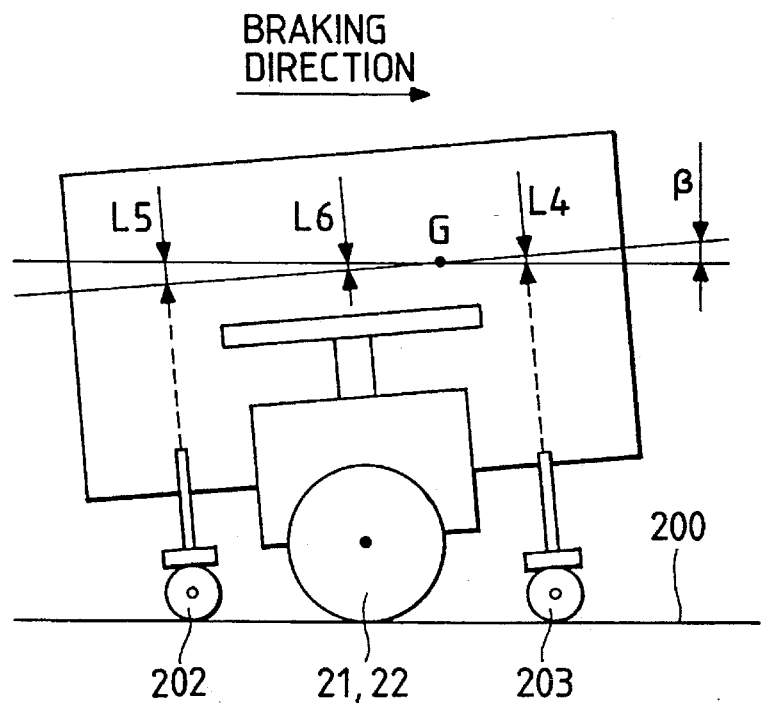

During the braking acceleration, that is, during the deceleration, from time t10 to time t15, in the state where the braking acceleration (deceleration) reaches a2, the posture of the carriage is inclined by an angle β in a direction so as to sink or lower the front part of the carriage with respect to the center of gravity G of the carriage, as shown in FIG. 10B, due to frictional resistance between the driven wheels 21 and 22 and the running surface 200. Accordingly, the spring 94 of the forward caster 202 contracts by a length L5, while the spring 94 of the rear caster 203 extends by a length L4. This causes the springs 72 of the driven wheels 21 and 22 to contract by a length L6. The length L6 represents a mean value of contracted lengths of the springs 72 like the length L3.

The mean extended/contracted lengths of the springs 72 of the driven wheels 21 and 22 while the elevator section 40 is not operated are shown by broken line in FIG. 9C, and the corresponding inclined angles of the carriage are shown by broken line in FIG. 9D.

Now, the state of the carriage while the elevator section 40 is operated will be explained hereinbelow.

In order to counterbalance or cancel the extending/contracting motions of the springs 72 of the driven wheels 21 and 22 as represented by the broken line in FIG. 9C, that is, the corresponding extending/contracting motions of the springs 94 of the front and rear casters 202 and 203, the driven wheels 21 and 22 are raised or lowered by the elevator section 40 as shown by solid line in FIG. 9C.

Specifically, the driven wheels 21 and 22, that is, the drive section 20, start to be raised from an initial position at time t1 which is before time t2 when the acceleration of the carriage starts to be changed or when the displacement of the springs 72 of the driven wheels 21 and 22 and the corresponding displacement of the springs 94 of the front and rear casters 202 and 203 start to be caused due to the acceleration. Subsequently, the upward movement of the driven wheels 21 and 22 is stopped at time t4 which is after time t3 when the acceleration of the carriage reaches a1 or when the acceleration of the carriage becomes constant to cause the displacement of the springs 72 and the springs 94 due to the acceleration to be constant. A raised amount of the driven wheels 21 and 22 is held at a fixed value corresponding to the length L3 from time t4 to time t5. Subsequently, the driven wheels 21 and 22 start to be lowered at time t5 which is before time t6 when the acceleration of the carriage starts to be decreased. The lowering of the driven wheels 21 and 22 continues until time t8 which is after time t7 when the acceleration becomes 0 (zero).

The driven wheels 21 and 22 are lowered by an amount L7 which is held from time t8 to time t9. The lowered amount L7 is set to a value considerably smaller than the lengths L3 and L6 and thus does not make the inclination of the carriage large. On the other hand, loads of the carriage distributed to the driven wheels 21 and 22 and the front and rear casters 202 and 203 are changed due to the lowering of the driven wheels 21 and 22. Specifically, the loads applied to the driven wheels 21 and 22 are increased, while the loads applied to the front and rear casters 202 and 203 are decreased. This causes vibration applied to the front and rear casters 202 and 203 from the running surface 200 to be decreased, while causes vibration applied to the driven wheels 21 and 22 from the running surface 200 to be increased. Since a distance from the center of gravity G to each of the front and rear casters 202 and 203 is longer than a distance from the center of gravity G to each of the driven wheels 21 and 22, the vibration applied to the carriage as a whole is diminished.

The driven wheels 21 and 22 start to be further lowered at time t9 which is before time t10 when the acceleration of the carriage starts to be changed or when the displacement of the springs 72 and the springs 94 due to the acceleration start to be caused. Subsequently, the downward movement of the driven wheels 21 and 22 is stopped at time t12 which is after time t11 when the acceleration of the carriage reaches a2 or when the acceleration of the carriage becomes constant to cause the displacement of the springs 72 and the springs 94 due to the acceleration to be constant. A lowered amount of the driven wheels 21 and 22 is held at a fixed value corresponding to the length L6 from time t12 to time t13. Subsequently, the driven wheels 21 and 22 start to be raised at time t13 which is before time t14 when the acceleration (or deceleration) of the carriage starts to be increased (or decreased). The raising of the driven wheels 21 and 22 is finished to return them to the initial positions at time t16 which is after time t15 when the carriage is stopped.

Figure 11:
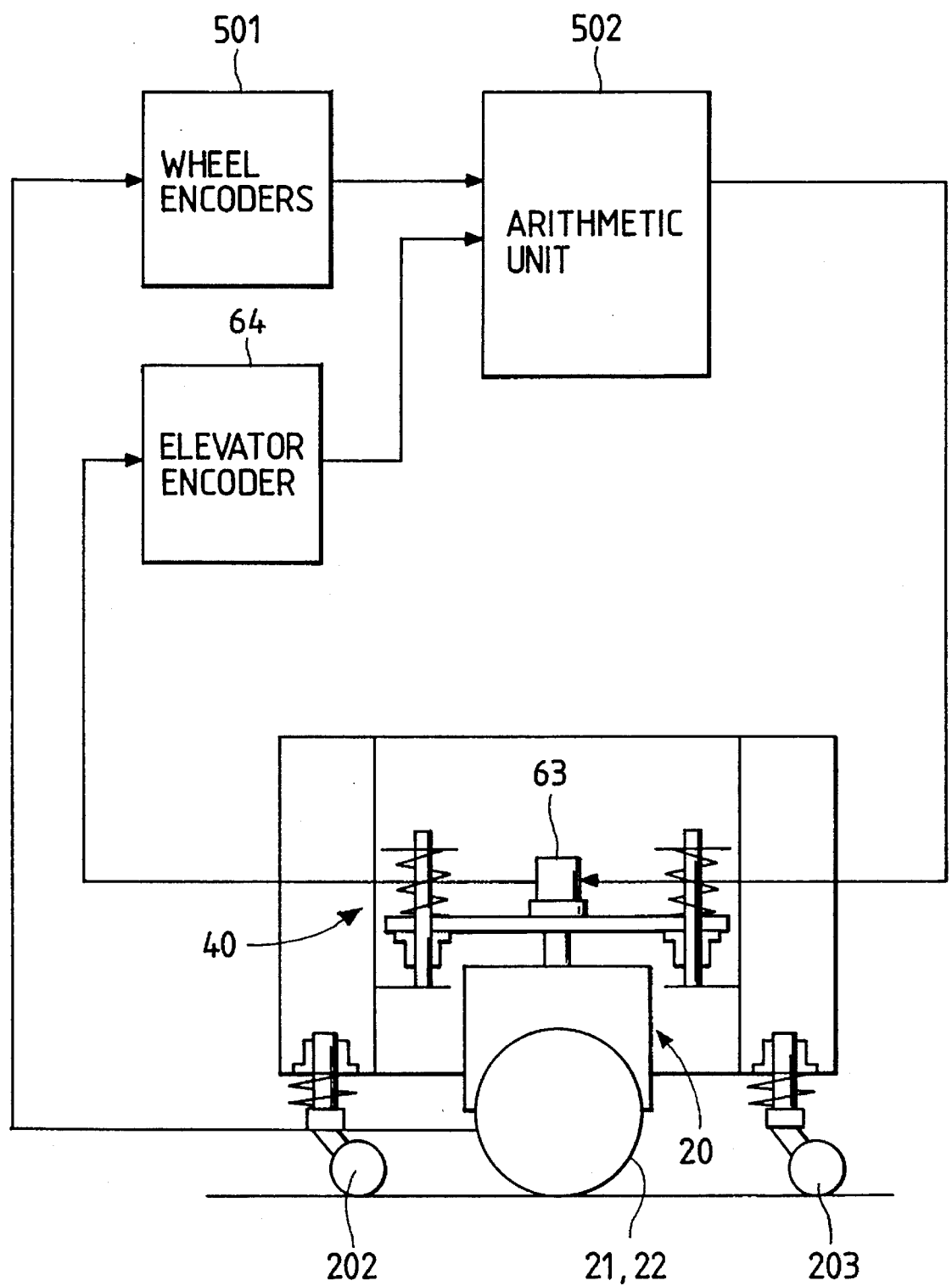
FIG. 11 is a block diagram showing control means for controlling an operation of the elevator section of the carriage according to the preferred embodiment.

The foregoing operation of the elevator section 40 is controlled by control means. As shown in FIG. 11, the control means includes the foregoing elevator encoder 64, a pair of wheel encoders 501 and an arithmetic unit 502.

The wheel encoders 501 include wheel speed sensors, respectively, for monitoring speeds of the corresponding driven wheels 21 and 22. Each wheel encoder 501 outputs the monitored speed to the arithmetic unit 502 in the form of a pulse signal.

The arithmetic unit 502 calculates, per 10 ms, the number of pulses inputted from each wheel encoder 501 to derive the speed of the corresponding driven wheel. The arithmetic unit 502 derives a command torque signal for controlling the operation of the elevator servomotor 63 based on a current vertical position of the elevator section 40 derived from an output of the elevator encoder 64 and various other calculation results including the monitored wheel speeds. The arithmetic unit 502 outputs the derived command torque signal to the elevator servomotor 63 to control the operation thereof.

The arithmetic unit 502 may be arranged to further perform other controls of the carriage, such as, the turning angle control of the travel sections 41 and 42 and the speed control of the carriage. Alternatively, other arithmetic units may be provided for the respective controls of the carriage.

The arithmetic unit 502 may be installed in the carriage. Alternatively, the arithmetic unit 502 may be provided outside the carriage so as to control the operation of the elevator section 40 by radio communication with a transmit-receive unit installed in the carriage. In the latter case, a centralized control for a proper number of the carriages may also be possible.

Figure 12:
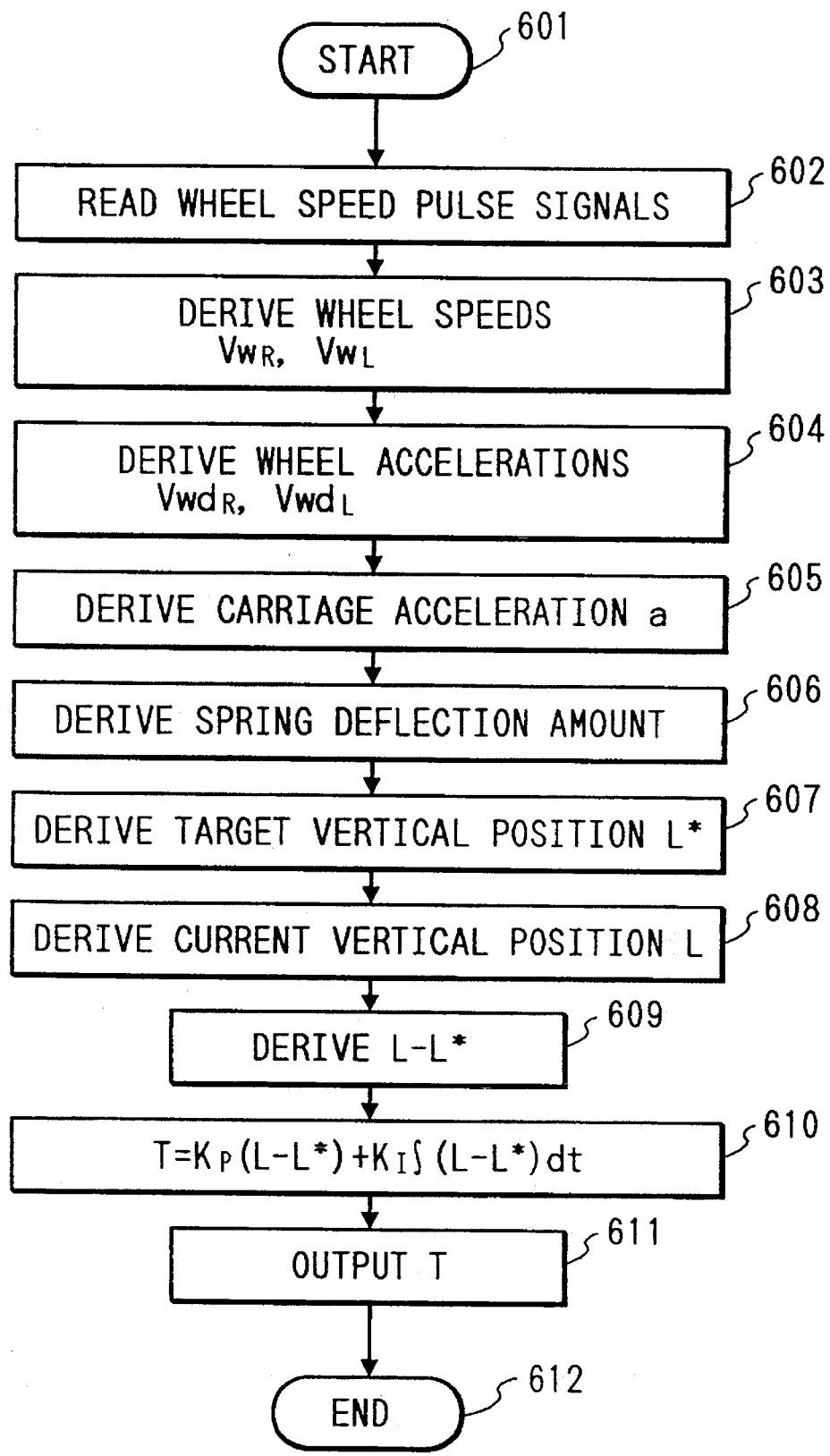
FIG. 12 is a flowchart showing a routine for controlling the operation of the elevator section of the carriage according to the preferred embodiment.
Figure 13:
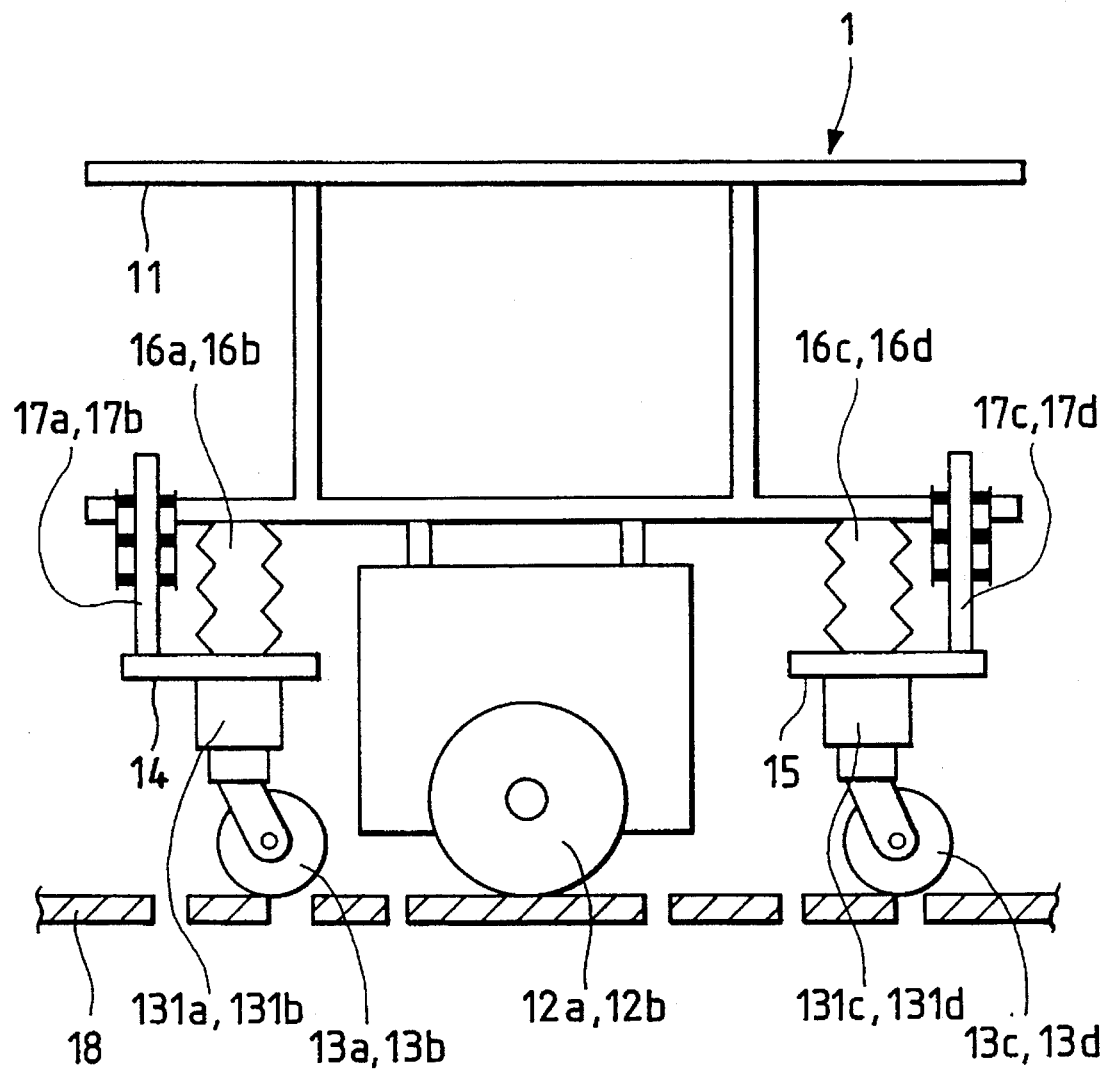
FIG. 13 is a diagram showing a schematic structure of a conventional carriage.

FIG. 12 is a flowchart showing a routine to be executed by the arithmetic unit 502 per 10 ms for controlling the operation of the elevator section 40.

At step 602, the arithmetic unit 502 reads out wheel speed indicative pulse signals inputted from the wheel encoders 501, respectively. At step 603, speeds VwR and VwL of the driven wheels 21 and 22 are derived based on the corresponding wheel speed signals read out at step 602. Subsequently, at step 604, wheel accelerations VwdR and VwdL are derived from the wheel speeds VWR and VWL derived at step 603. At step 605, an acceleration a of the carriage is derived from the wheel accelerations VwdR and VwdL in the known manner. Subsequently, at step 606, a spring deflection amount is derived based on the carriage acceleration a derived at step 605 and experimental data obtained through experiments conducted by the present inventors. The experimental data define the spring deflection mount in terms of the carriage acceleration a. The spring deflection amount derived at step 606 represents a mean value of deflection amounts of the springs 72 of the driven wheels 21 and 22 like the foregoing length L3 or L6.

The routine now proceeds to step 607 where a target vertical position L* of the elevator section 40, that is, of the driven wheels 21 and 22, is derived based on the spring deflection amount derived at step 606. At step 608, a current vertical position L of the elevator section 40, that is, of the driven wheels 21 and 22, is derived based on a current vertical position indicative pulse signal inputted from the elevator encoder 64. As appreciated, the elevator encoder 64 includes a position sensor for monitoring a rotation angle of the servomotor 63 to detect a current vertical position of the elevator section 40 and outputs the detected current vertical position to the arithmetic unit 502 in the form of a pulse signal.

Subsequently, at step 609, a deviation between the target vertical position L* derived at step 607 and the current vertical position L derived at step 608 is derived based on L–L*. The deviation L–L* represents a required displacing amount of the elevator section 40 or of the driven wheels 21 and 22. At step 610, a command torque T for controlling the operation of the elevator servomotor 63 is derived based on the required displacing amount derived at step 609. Specifically, the command torque T is derived from the following equation:

$$T=KP(L-L^*)+KI\int(L-L^*)dt$$

wherein KP and KI represent preset constants, respectively.

The routine now proceeds to step 611 where the command torque T derived at step 610 is outputted to the elevator servomotor 63 to control the operation thereof, and then is terminated. By repeatedly executing the foregoing control routine per 10 ms, the vertical position of the elevator section 40 or of the driven wheels 21 and 22 is controlled.

Inclined angles of the carriage while the elevator section 40 is operated according to the control routine of FIG. 12 is shown by solid line in FIG. 9D. As appreciated, the inclined angles represented by the solid line in FIG. 9D correspond to differences between the solid line and the broken line in FIG. 9C. As seen from FIG. 9D, by operating the elevator section 40 during the running of the carriage, variation in inclination of the carriage is reduced to suppress the vibration of the carriage while running. Further, the rubber cushions 98 work to prevent the springs 94 of the front and rear casters 202 and 203 from extending during the starting and braking of the carriage to suppress the inclination of the carriage, and further work to damp the vibration.

It may be arranged that, during the starting acceleration and the braking acceleration, at least one of the driven wheels 21 and 22 and the casters 91 is raised or lowered as in the foregoing manner to suppress the inclination of the carriage.

In the foregoing preferred embodiment, the center gear 311 and the right and left gears 253 and 263 are used for ensuring the turning motions of the travel sections 41 and 42 in phase with each other.

Specifically, for turning the travel sections 41 and 42 in phase with each other, the driven wheels 21 and 22, that is, the drive section 20, are raised by the elevator section 40 while the carriage is stopped, so that the driven wheels 21 and 22 are separated from the running surface 200 and abut against lower surfaces of a pair of steering plates 110 (see FIG. 1). The steering plates 110 are separately arranged above the driven wheels 21 and 22 and fixed to the carriage frame 100. In this state, when the electromagnetic brake 50 is energized, the electromagnetic brake 50 is released to allow the brake shaft 51 to rotate. Then, the driven wheels 21 and 22 are rotated in opposite directions from each other while the driven wheels 21 and 22 remain in abutment with the steering plates 110. This causes the driven wheels 21 and 22 to run on the lower surfaces of the steering plates 110, respectively, so that, due to the engagement of the right and left gears 253 and 263 with the center gear 311, the travel sections 41 and 42 turn in phase with each other relative to the carriage frame 100. The turning motions of the travel sections 41 and 42 are transmitted to the brake shaft 51 and monitored by the encoder 54 as described before.

On the other hand, for the running of the carriage, the electromagnetic brake 50 is deenergized to brake the brake shaft 51 so that the small pulley 52, the large pulley 312, the center gear 311, and the right and left gears 253 and 263 are prohibited from rotation. Accordingly, further turning motions of the travel sections 41 and 42 are prohibited. Then, the elevator section 40 lowers the driven wheels 21 and 22 to the running surface 200. In this state, when the driven wheels 21 and 22 are rotated in the same direction, the carriage runs straight in a new direction.

According to the foregoing preferred embodiment, the posture control of the carriage as represented by the flow-chart in FIG. 12 is performed only when the carriage runs in a longitudinal direction of the carriage. In other words, when the carriage runs in a direction other than the longitudinal direction, for example, in a lateral direction of the carriage, the foregoing posture control is not performed. The reason for this is as follows:

In general, when the carriage runs in a direction other than the longitudinal direction, the speed of the carriage is controlled to be held low. Accordingly, it is not practically necessary to perform the foregoing posture control of the carriage.

On the other hand, it may be arranged that the posture control of the carriage is performed not only for the running in the longitudinal direction but also for the running in other directions. In this case, the experimental data defining the spring deflection amount in terms of the carriage acceleration a are prepared for each of the preselected running directions, and the center of gravity of the carriage is set at a position which is offset from the center of the carriage both longitudinally and laterally.

On the other hand, for the in-phase turning motions of the travel sections 41 and 42, a linkage or a belt may be used instead of the foregoing gear mechanism.

Further, in the foregoing preferred embodiment, the elevator servomotor 63, the elevator encoder 64, the ball screw 61 and the nut 60 are used for raising or lowering the drive section 20. Instead, a direct-acting motor may be used to form a mechanism which makes a linear motion as a whole. Further, in the foregoing preferred embodiment, the ball screw 61 and the nut 60 are used for converting a rotational motion to a linear motion. Instead, rack and pinion may be used for such conversion of the motions.

Further, in the foregoing preferred embodiment, the springs 72 are used as vibration-proof means of the elevator section 40. Instead, an elastic material, such as, rubber for absorbing the vibration or a mechanism utilizing the repulsive force of magnets may be used independently or in combination.

Further, in the foregoing preferred embodiment, the spring 94, the spring covers 95a and 95b, the height-adjusting shim 96 and the rubber cushion 98 are provided as vibration-proof means only for the linear shaft 93a. On the other hand, these members may also be provided for the linear shaft 93b. Further, the positional order of the spring 94 and the rubber cushion 98 may be reversed.

Further, in the foregoing preferred embodiment, the driven wheels 21 and 22 are positioned forward of the center of gravity G of the carriage. It may also be arranged that the driven wheels 21 and 22 are positioned rearward of the center of gravity G. In this case, the upward and downward motions of the driven wheels 21 and 22 are controlled in a reversed manner.

Further, in the foregoing preferred embodiment, the elevator encoder 64 is used for monitoring the vertical position of the elevator section 40. Instead, a distance sensor may be used for monitoring such a position. Further, when the raising and lowering amounts of the elevator section 40 are constant, limit switches may be used therefor. It is preferable that the time-domain variation of the up/down amounts of the driven wheels controls the variation of the carriage inclination to be as small as possible. Further, by adding a detector for monitoring vibration of the carriage and a control unit for raising and lowering the driven wheels depending on an output of the vibration detector, vibration caused by irregularities on the running surface can be reduced.

As described above, according to the control system for the carriage according to the preferred embodiment, since the caster sections are mounted to the carriage frame independently of each other, the casters move upward and downward depending on irregularities on the running surface so that separation of any of the casters from the running surface is effectively prevented. Further, since the inclination of the carriage is suppressed during the starting and braking of the carriage and the vibration of the carriage is reduced while running, the running of the carriage can be stable. Further, since the inclination and vibration of the carriage can be suppressed, the starting acceleration and the braking acceleration (deceleration) can be increased. Further, since the increment of the starting acceleration and the braking acceleration allows the carriage to run at a high speed and for a long time, the carrying capacity of the carriage is improved to enhance the production efficiency.

It is to be understood that this invention is not to be limited to the preferred embodiments and modifications described above, and that various changes and modifications may be made without departing from the spirit and scope of the invention as defined in the appended claims.

What is claimed is:

1. A control system for a carriage which runs on a running surface, said control system comprising:

a frame forming an outer structure of said carriage;

a plurality of wheels mounted to said frame;

a drive source for transmitting a driving force to at least one of said wheels; and posture control means, depending on an acceleration condition of said carriage, for raising or lowering at least one of said wheels relative to said frame so as to change a posture of said carriage, said posture control means including:

vibration-proof means mounted to said frame, and elevator means for raising or lower at least a pair of said wheels arranged at a lower center of said frame.

2. The control system as set forth in claim 1, wherein said vibration-proof means includes a magnetic body which provides a vibration damping action.

3. The control system as set forth in claim 1, wherein said elevator means raises or lowers the pair of said wheels in a direction to cancel displacement of said vibration-proof means.

4. The control system as set forth in claim 3; wherein said elevator means starts to raise or lower the pair of said wheels before said vibration-proof means displaces due to acceleration of said carriage, while stops raising or lowering the pair of said wheels after the displacement of said vibration-proof means due to the acceleration of said carriage becomes constant.

5. The control system as set forth in claim 3, wherein said elevator means starts to raise or lower the pair of said wheels before said vibration-proof means displaces due to acceleration of said carriage, while stops raising or lowering the pair of said wheels after the acceleration of said carriage becomes constant.

6. The control system as set forth in claim 1, wherein said elevator means includes motion conversion means for converting a rotational motion to a linear motion.

7. The control system as set forth in claim 4, wherein said elevator means includes motion conversion means for converting a rotational motion to a linear motion.

8. The control system as set forth in claim 6, Wherein said motion conversion means includes a ball screw and a nut.

9. The control system as set forth in claim 7, wherein said motion conversion means includes a ball screw and a nut.

10. The control system as set forth in claim 1, wherein said vibration-proof means includes an elastic body which provides a vibration damping action.

11. The control system as set forth in claim 4, wherein said vibration-proof means includes an elastic body which provides a vibration damping action.

12. The control system as set forth in claim 11, wherein said elastic body includes at least one of a spring and a rubber cushion.

13. The control system as set forth in claim 10, wherein said elastic body includes at least one of a spring and a rubber cushion.

14. A control system for a carriage which runs on a running surface, said control system comprising:

a frame forming an outer structure of said carriage;

a plurality of wheels mounted to said frame;

a drive source for transmitting a driving force to at least one of said wheels;

posture control means, depending on a running condition of said carriage, for raising or lowering at least one of said wheels relative to said frame so as to change a posture of said carriage; and said posture control means including elevator means for lowering, during a steady running of said carriage, at least a pair of said wheels relative to said frame, the pair of said wheels being arranged at a lower center of said frame.

15. The control system as set forth in claim 14, wherein said elevator means lowers the pair of said wheels by an essentially constant amount during the steady running of said carriage.

* * * * *